US010097097B2

(12) United States Patent
Tichy et al.

(10) Patent No.: US 10,097,097 B2
(45) Date of Patent: Oct. 9, 2018

(54) METHOD AND APPARATUS FOR SELF-SYNCHRONIZATION OF A SYNCHRONOUS RECTIFIER

(71) Applicant: Semiconductor Components Industries, LLC, Phoenix, AZ (US)

(72) Inventors: Tomas Tichy, Jihlava (CZ); Karel Ptacek, Roznov pod Radhostem (CZ)

(73) Assignee: Semiconductor Components Industries, LLC, Phoenix, AZ (US)

( * ) Notice: Subject to any disclaimer, the term of this patent is extended or adjusted under 35 U.S.C. 154(b) by 765 days.

(21) Appl. No.: 14/265,575

(22) Filed: Apr. 30, 2014

(65) Prior Publication Data

US 2015/0318790 A1 Nov. 5, 2015

(51) Int. Cl.
*H02M 3/335* (2006.01)
*H02M 1/00* (2006.01)

(52) U.S. Cl.
CPC ....... *H02M 3/33592* (2013.01); *H02M 3/335* (2013.01); *H02M 3/33576* (2013.01); *H02M 2001/0038* (2013.01); *Y02B 70/1475* (2013.01)

(58) Field of Classification Search
CPC ......... H02M 3/33592; H02M 3/33576; H02M 3/335
See application file for complete search history.

(56) References Cited

U.S. PATENT DOCUMENTS 7,030,596 B1 * 4/2006 Salerno ................ H02M 3/158
323/282
2009/0016083 A1 * 1/2009 Soldano ............ H02M 3/33592
363/20

OTHER PUBLICATIONS

Understanding Digital Buffer, Gate, and Logic IC Circuits—Part 1; Ray Marston; Nuts & Volts Magazine (Apr. 2007).*
Operational Amplifier Circuits Comparators and Positive Feedback; Chaniotakis and Cory; 2006; MIT OpenCourseWare by PI Hutchinson—2004.*
Secondary Side Synchronous Rectification Driver for High Efficiency SMPS Topologies; NCP4303A, NCP4303B; Semiconductor Components Industries, LLC. Jun. 2011—Rev. 4, http://onsemi.com.
"Secondary Side Synchronous Rectification Driver for High Efficiency SMPS Topologies"; NCP4304A, NCP4304B; Semiconductor Components Industries, LLC. Jan. 2014—Rev. 4, http://onsemi.com.
"International Rectifier"; IR11672AS; Datasheet No. PD97469, Jul. 13, 2011, http://www.irf.com.

* cited by examiner

*Primary Examiner* — Timothy J Dole
*Assistant Examiner* — Ishrat Jamali
(74) *Attorney, Agent, or Firm* — Robert F. Hightower (57) ABSTRACT

A method and synchronous rectifier controller uses minimum off and on time blanking to avoid switching the switching transistor at incorrect times responsive to transients in the current sense signal. The minimum off time timer is commenced only when the current sense signal is above a reset threshold, and is reset when the current sense voltage falls below the reset threshold. Resetting the minimum off time timer in this manner avoids false starts of the minimum off time timer due to transients and allows the SRC to properly synchronize with the conduction and blocking phases of rectifier operation.

20 Claims, 5 Drawing Sheets

METHOD AND APPARATUS FOR SELF-SYNCHRONIZATION OF A SYNCHRONOUS RECTIFIER

FIELD OF THE DISCLOSURE

The present disclosure relates generally to switched mode power supply circuits, and more particularly to switched mode power supplies that use synchronous rectifiers and minimum blanking times to prevent triggering on noise components of a monitored signal.

BACKGROUND

Switched mode power supplies are widely used in a variety of applications due to their efficiency over alternative electric power regulators such as linear regulators. One technique for increasing the efficiency of a switched mode power supply (SMPS) is synchronous rectification. Rectifiers (e.g. diodes) are conventionally used on the secondary side to convert the alternating current (AC) waveform propagated through the transformer in a direct current (DC) at a regulated level, either voltage or current. The voltage drop across a diode, however, is a source of loss.

To reduce the loss due to rectification a switching transistor such as a metallic oxide semiconductor field effect transistor (MOSFET) or an enhancement mode gallium arsenide transistor can be used instead. The switching transistor, although it has an inherent body diode, is switched on when current flows in the appropriate direction, and then switched off otherwise to operate as a rectifier. Since a switching transistor can have on the order of milliohms or a few tenths of a milliohm of on-resistance, much less of a voltage drop results typically, compared to use of even a Schottky diode for most power converter applications.

Control of the switching transistor rectifier is typically based on current through the switching transistor. On a normal conduction phase, voltage build across the switching transistor, and some leakage current may pass through the body diode of the switching transistor. When this voltage drop is sensed, the switching transistor can be switched on. When the voltage across the switching transistor then drops back to zero, or sufficiently low to indicate the end of the conduction phase, the switching transistor can be turned back off to provide proper rectifier operation.

However, noise resulting from switching transients can result in false triggering of the switching transistor, leading to inefficient operation. False triggering can be alleviated by the use of minimum on and off times, which allow transients to dissipate before sensing. Thus, transients that occur during these "blanking" times are ignored and have no effect on the switch control of the switching transistor rectifier. A problem still remains, though, after turn on, or after enabling the synchronous controller, since those events can occur just prior to the occurrence of a transient, which can be falsely detected as a proper triggering event and rectifier control will not be properly synchronized.

Accordingly, there is a need for a method and apparatus for self-synchronous rectifier control in response to turn-on and enabling events.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments disclosed herein include a method for self-synchronization in a synchronous rectifier controller (SRC). The method includes sensing a current sense signal, comparing the current sense signal to a RESET threshold, commencing a minimum off time timer when the current sense signal exceeds the RESET threshold, and resetting the minimum off time timer when the current sense voltage falls below the RESET threshold before the minimum off time timer has lapsed.

Embodiments also include a SRC that includes a RESET comparator that compares a current sense signal to a RESET threshold and provides an output that is asserted when the current sense signal is above the RESET threshold and de-asserted otherwise. The SRC can also include a minimum off time timer, and control logic that commences the minimum off time timer when the output of the RESET comparator is asserted and resets the minimum off time timer when output of the RESET comparator is de-asserted.

Figure 1:
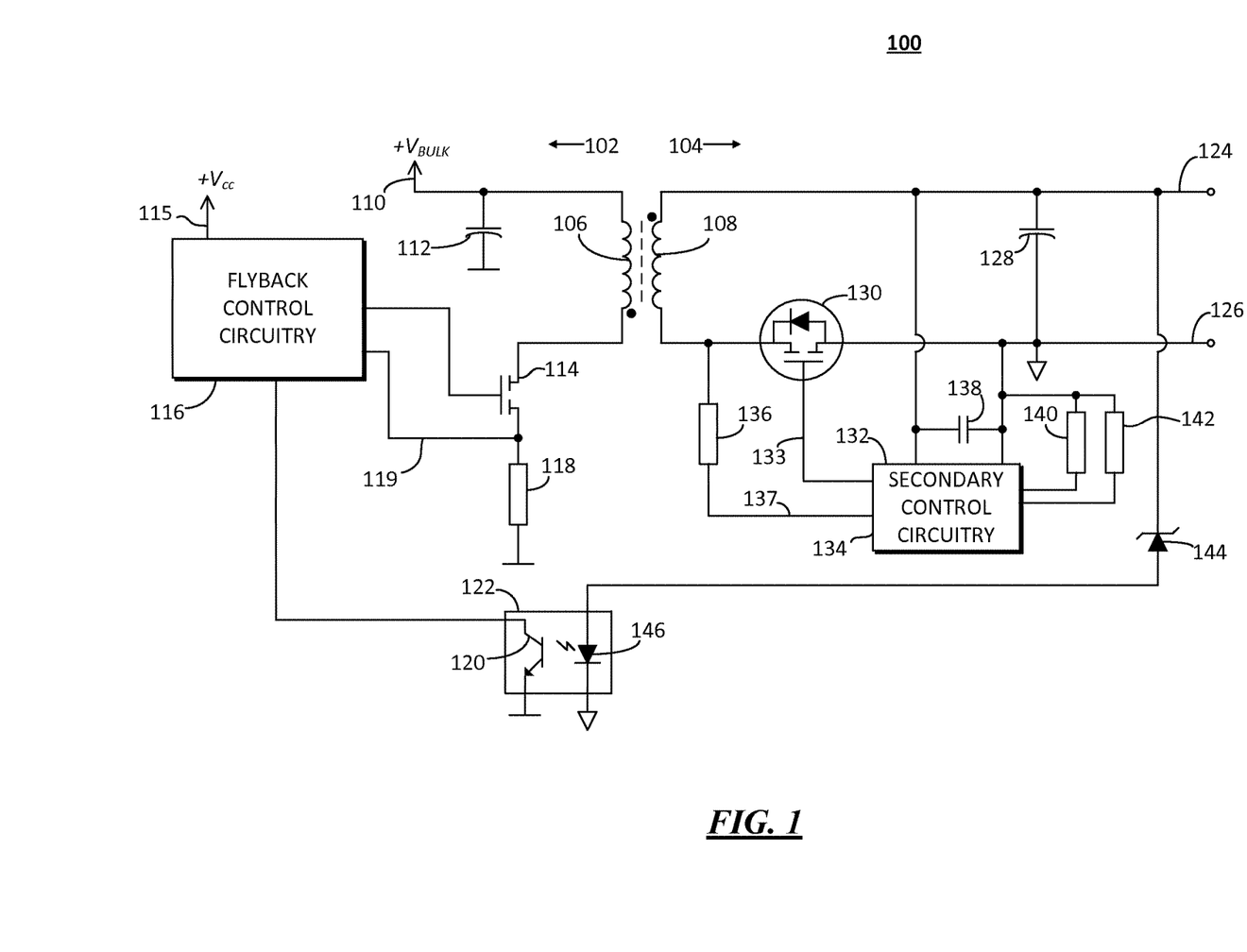
FIG. 1 is a block diagram of switched mode power supply in accordance with some embodiments.

FIG. 1 is a block diagram of switched mode power supply (SMPS) 100 in accordance with some embodiments. The SMPS 100 can be, for example, a flyback power supply or converter, which is one of the known SMPS topologies commonly used. A transformer defines a primary side 102 and a secondary side 104, and includes a primary winding 106 on the primary side 102, and a secondary winding 108 on the secondary side 104. The primary and secondary sides 102, 104 are DC-isolated from each other.

On the primary side 102, a bulk voltage 110 is evident across a bulk capacitor 112, and is typically derived from rectification of an AC source, such as conventional AC commercial service (i.e. 110 VAC or 220 VAC). Current is switched through the primary winding 106 by a switch 114, which is controlled by flyback control circuitry 116. The current through the primary winding 106 can be sensed using a sense resistor 118 which produced a sensing voltage on line 119 that is proportional to the current through the primary winding 106. The flyback control circuitry can also sense an output level at an output of the secondary side 104 using an opto-transistor 120 in an opto-isolator 122.

The output of secondary side 104 is produced between a positive output 124 and a ground 126, and is supported by a bulk capacitor 128. Feedback to the primary side 102 is facilitated by a zener diode 144 that is coupled to a light emitting diode 146 in the opto-isolator 122. The rectification operation is provided by a MOSFET 130. In the present example the MOSFET 130 can be an N-channel MOSFET with its drain connected to the secondary winding 108 and its source connected to the ground 126. The MOSFET 130 is switched on or off by the synchronous rectifier controller 132 via a drive line 133 connected to the gate of the MOSFET 130. The current through the secondary winding 108 is sensed across the MOSFET, between the drain and source. A current sense resistor 136 can be used in some embodiments to level shift a current sense signal on line 137, but typically where the current sense resistor 136 is shown there would be a zero ohm line. The current sense signal is used by the synchronous rectifier controller 132 to determine when to switch the MOSFET 130 on or off. Switching of the MOSFET 130 can be facilitated by a voltage provided by a decoupling capacitor 138.

The synchronous rectifier controller 132 utilizes on and off time blanking to prevent false triggering due to transients, and minimum on and off times can be set by resistors 140, 142, respectively. However, in conventional systems that use time blanking, synchronization errors can still occur, for example, after start up, when errant transients can otherwise falsely trigger blanking timers. The synchronous rectifier controller 132 employs self-synchronization to avoid false triggering of blanking times by allowing a reset of blanking times based on the current sense signal 137. The current sense signal 137 is compared to three thresholds; an ON threshold, an OFF threshold, and a RESET threshold. The ON threshold is used to determine when to turn on the MOSFET 130, and is the lowest voltage, and negative compared to ground 126. The OFF threshold is also negative, but not as far below ground 126 as the ON threshold. When the current sense voltage rises from the ON threshold to the OFF threshold (after the minimum on time has elapsed), the MOSFET 130 is shut off. The RESET threshold is above the OFF threshold, and can be above ground 126. The off time counter only runs when the current sense voltage is above the RESET threshold. If the off time timer is commenced, and the current sense voltage falls below the RESET threshold, the off time timer is reset, and not commenced again until the current sense voltage is above the RESET threshold. By resetting the off time timer, when the current sense voltage falls below the RESET threshold, short term excursions above the RESET threshold, such as those produced by transients, prevent a false start to the off time timer.

Figure 2:
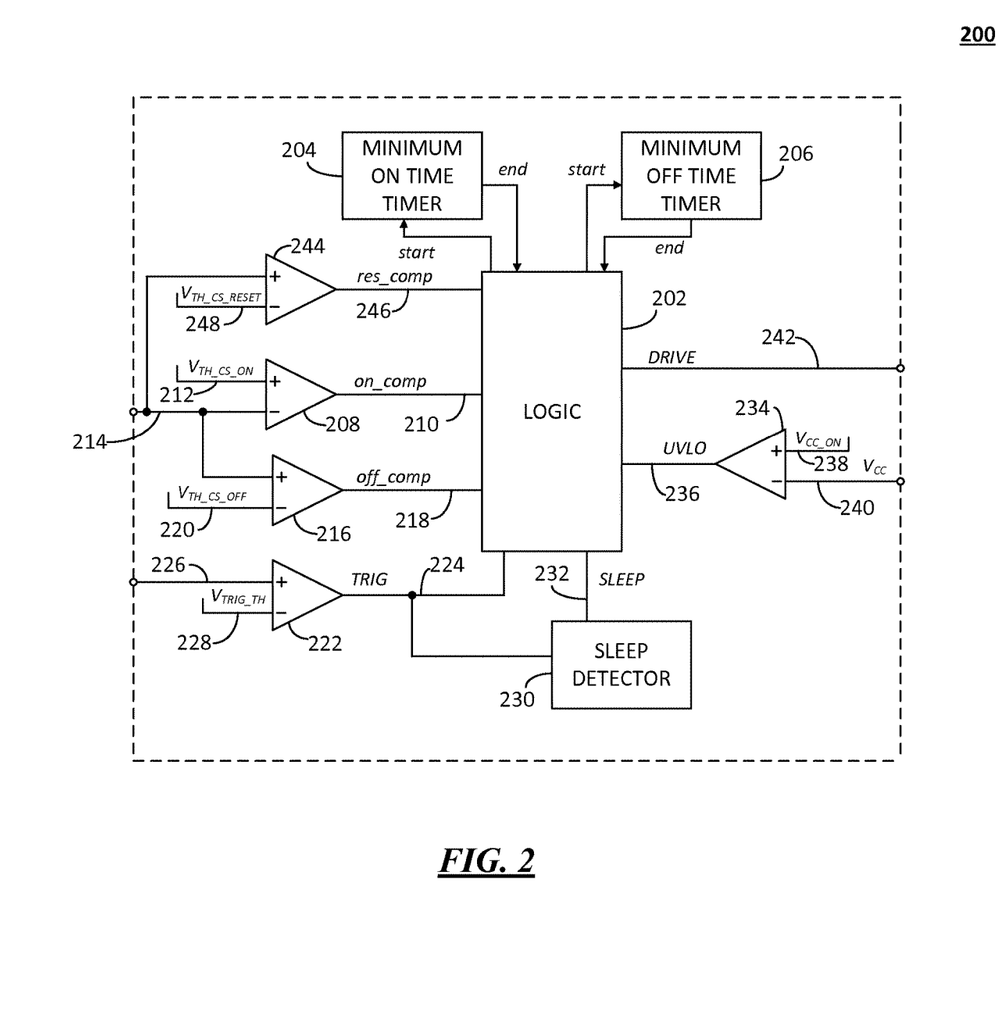
FIG. 2 is a block diagram of a synchronous rectifier controller in accordance with some embodiments.

FIG. 2 is a block diagram of a synchronous rectifier controller (SRC) 200 in accordance with some embodiments. The SRC 200 can be an example of the synchronous rectifier controller 132 of FIG. 1. The SRC 200 includes control logic 202 that determines when the assert and de-assert a drive signal 242 based on other signals and an internal state machine. The control logic 202 controls a minimum on time timer 204 and a minimum off time timer 206. Each of which are started by a respective start signal issued by the control logic 202, which causes the respective timer 204, 206 to start counting to a preselected value (which can be externally configurable, e.g. resistors 140, 142 of FIG. 1). Each of the timers 204, 206 provide a respective end signal after reaching its preselected value. The start signal can act as a reset that sets the timer value and clears the respective end signal in some embodiments. Alternatively a separate reset line (not shown) could be used to reset each timer.

Several comparators provide input to the control logic 202, including a RESET comparator 244, an ON comparator 208, and OFF comparator 216, and a TRIG comparator 222. The RESET, ON, and OFF comparators 244, 208, 216 all sample the current sense signal 214, which corresponds to the voltage across the MOSFET switch (e.g. MOSFET 130 of FIG. 1).

The ON comparator 208 compares the current sense signal 214 with an ON threshold 212, $V_{TH\_CS\_ON}$. When the current sense signal 214 goes below the ON threshold, the output 210 ("on_comp") of the ON comparator 208 will be asserted, and de-asserted otherwise. The ON comparator 208 is used to detect a condition indicating that the MOSFET should be turned on, normally. Transient excursions below the ON threshold 212 during normal operation can be mitigated at the end of conduction periods when the MOSFET is switched off by the state operation of the control logic 202.

The OFF comparator 216 compares the current sense signal 214 with the OFF threshold 220, $V_{TH\_CS\_OFF}$. The output 218 ("off_comp") of the OFF comparator 216 is used by the state machine of the control logic 202 to determine when to switch off the MOSFET, and it is asserted while the current sense signal 214 is above the OFF threshold 220. Thus, after turning the MOSFET on during a normal conduction phase (i.e. the drive signal 242 is asserted), the current sense signal 214 is initially below the OFF threshold 220, and the MOSFET stays on until the current sense signal 214 voltage rises above the OFF threshold 220, at which time the drive signal 242 is de-asserted.

The RESET comparator 244 is used to reset and re-commence the off time timer 206 to prevent transients from starting the off time timer 206 too early. The RESET comparator 244 compares the current sense signal 214 with a RESET threshold 248, $V_{TH\_CS\_RESET}$. Thus, the output 246 ("res_comp") of the RESET comparator 244 is only asserted when the current sense signal 214 voltage level is above the RESET threshold 248. The RESET threshold is higher than the OFF threshold, and can be a positive voltage level with respect to ground (i.e. at the source terminal of the MOSFET). The state machine of the control logic 202 uses the output 246 of the RESET comparator to reset the minimum off time timer 206, as is explained in further detail later.

The TRIG comparator 222 compares a TRIG input 226 with a TRIG threshold 228, $V_{TRIG\_TH}$. The output 224 ("TRIG") of the TRIG comparator 222 is used by the control logic 202 to disable the drive signal 242. Thus, the TRIG input can be used to disable switching operation of the SRC 200 momentarily, allowing only the body diode of the MOSFET to perform rectification. Furthermore, the TRIG output 224 can be used by a sleep detector 230 to commence a sleep mode by asserting a SLEEP signal 232 to the control logic 202. The sleep mode is used as a long term disable state to suppress synchronous rectification operation, such as under very light load conditions, for example.

An undervoltage lockout (UVLO) comparator 234 is used to prevent synchronous rectifier operation when the supply voltage 240, $V_{CC}$, is below a supply voltage threshold 238, $V_{CC\_ON}$. While the supply voltage 240 is below the supply voltage threshold 238, the output 236 ("UVLO") will be asserted, causing the control logic 202 to refrain from operating. Once the supply voltage 240 is sufficiently high and exceeds the supply voltage threshold 238, the UVLO output 236 will be de-asserted, allowing operation of the SRC 200, assuming control logic 202 is not otherwise disabled.

The SRC 200 can be implemented as a semiconductor device in an integrated circuit (IC) package. The IC package can include other circuitry as well in some embodiments. Some embodiments include a method of forming a SRC such as that exemplified in FIG. 2, such as, for example, forming control logic, forming a RESET comparator, OFF comparator, ON comparator, TRIG comparator, and UVLO comparator, as well as the minimum off and on time timers. The minimum off and time timers can be implemented as externally configurable so that the duration of each timer can be tailored for particular applications.

Figure 3:
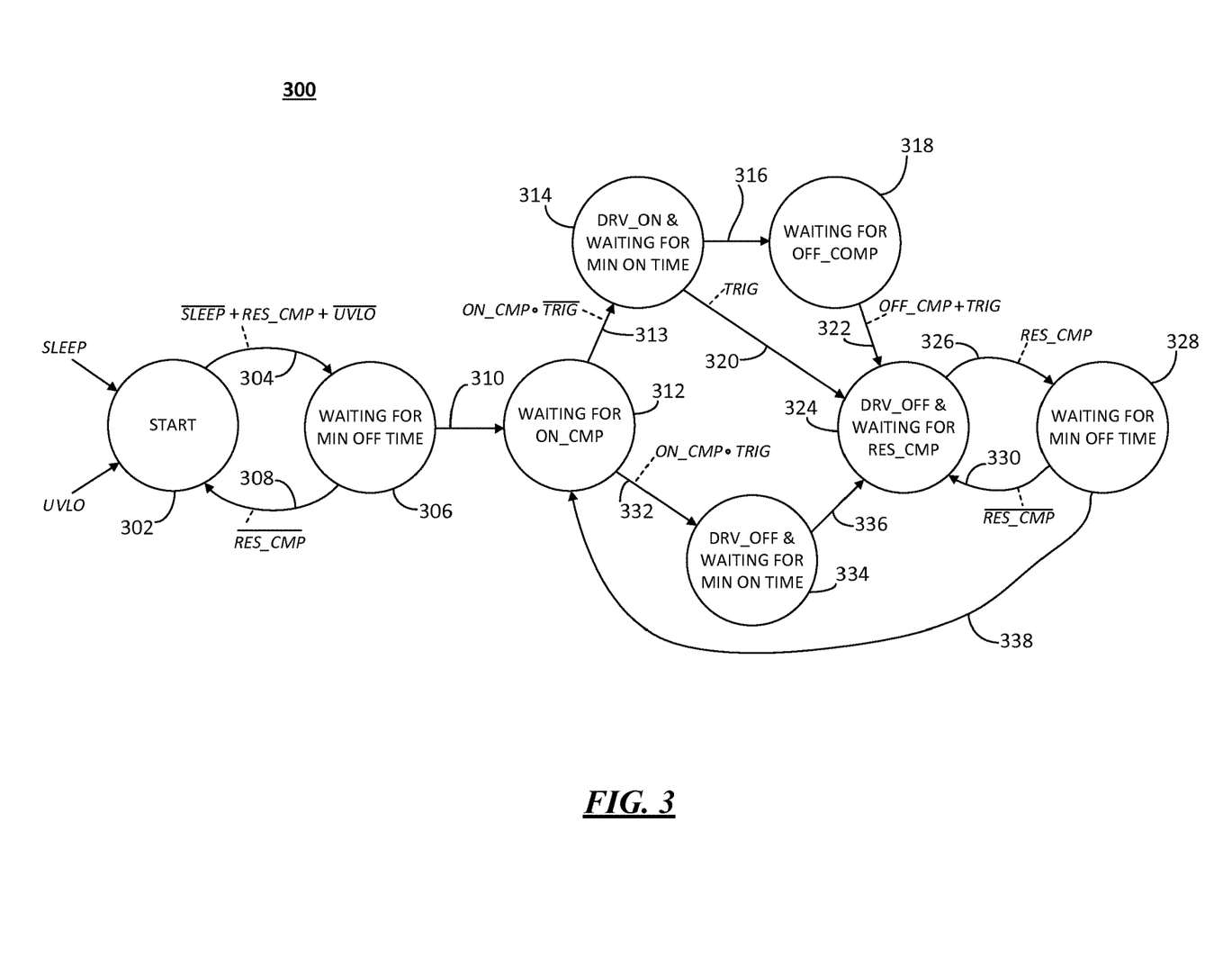
FIG. 3 is a state diagram of operation of a synchronous controller in accordance with some embodiments.

FIG. 3 is a state diagram 300 of operation of a SRC in accordance with some embodiments. The state diagram 300 can represent the state machine operation of the control logic 202 of FIG. 2. At the start 302, the SRC can be either starting up (UVLO) or in a sleep state (SLEEP). The drive signal provided to the MOSFET for controlling switching of the MOSFET will be off. The SRC state can transition 304 from the start state 302 to a minimum off time state 306, and that transition 304 occurs when the SLEEP signal (e.g. 232) is de-asserted, the output of the RESET comparator (e.g. 246) is asserted, and the under voltage lockout UVLO signal (e.g. 236) is de-asserted. In the off time state 306, upon entering, the minimum off time timer (e.g. 206) is commenced. While the minimum off time is pending (i.e. has not elapsed), if the RESET comparator output is de-asserted that SRC state returns to the start state 302 as indicated by transition 308. Thus, in state 306, the minimum off time must elapse while the RES_CMP signal is asserted in order to exit state 306. Upon the minimum off time elapsing while RES_CMP is asserted, the state transitions 310 to state 312 where the SRC then waits for the output of the ON comparator (ON_CMP) to be asserted, indicating conduction through the MOSFET. When the ON comparator output is asserted, and the TRIG signal ("TRIG") signal is de-asserted, the SRC state transitions from state 312 to state 314 via transition 313. In state 314 the drive signal (e.g. 242—"DRV_ON") is asserted to turn on the MOSFET, and the minimum on time timer (e.g. 204) is commenced and the SRC state remains in state 314 while the minimum on time is pending, which effectively blanks out transients that could otherwise terminate the on time of the MOSFET too early. As long as the TRIG signal is not asserted, when the minimum on time has elapsed, the SRC state transitions via transition 316 to state 318 where the SRC waits for the output of the OFF comparator (e.g. 218) to be asserted, or for the TRIG signal to asserted, as indicated by transition 322 to state 324. State 324 can also be transitioned to from state 314 if the TRIG signal is asserted while (in state 314) the minimum on time timer is pending, as indicated by transition 320. In state 324 the drive signal is turned off (DRV_OFF) and the SRC then waits for the RESET comparator output (RES_CMP) to be asserted. When the RESET comparator output is asserted then the SRC state transitions to state 328, as indicated by transition 326. Upon entering state 328, the minimum off time timer is started. If, in state 328, while the minimum off time timer is pending, the output of the RESET comparator is de-asserted, the SRC state transitions back to state 324, as indicated by transition 330. Otherwise, in state 328, if the minimum off time elapses, then the SRC state transitions back to state 312, as indicated by transition 338. In state 312, as was described previously, the SRC state can transition to state 314, but it can also transition to state 334 if, in state 312, the TRIG signal is asserted when the output of the ON comparator is also asserted, as indicated by transition 332. In state 334 the drive signal is turned off and the minimum on time timer is commenced. The SRC state transitions from state 334 to state 324 when, in state 334, the minimum on time timer has elapsed, as indicated by transition 336.

Thus, the SRC avoids early turn on of the minimum off time timer by requiring the output of the RESET comparator to be asserted while the minimum off time timer is pending, as indicated by the relationship between states 306 and 302, and between states 328 and 324. In states 306 and 328, if the output of the RESET comparator is de-asserted, as can occur during a transient event in the current sense voltage, the state is reset to the drive signal remaining off, and the minimum off time timer is not commenced until the output of the RESET comparator is asserted. By resetting the minimum off time timer in this manner the SRC state can be synchronized with the actual conduction and blocking phases required for proper rectification operation. It will also be appreciated by those skilled in the art that, during any of the SRC states of the state diagram 300, if either the SLEEP signal or the UVLO signal is asserted, the SRC state can transitions back to the start state 302.

Figure 4:
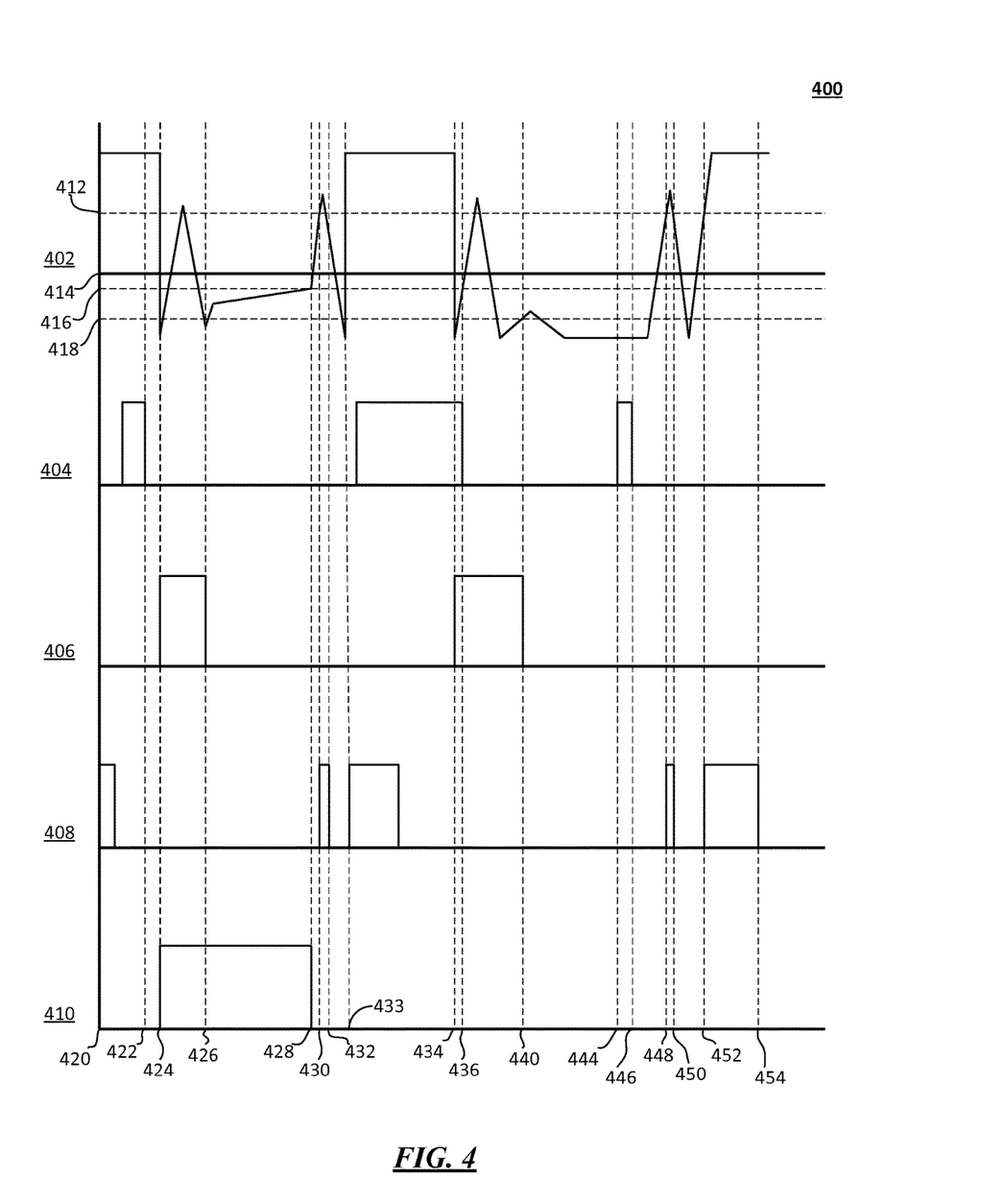
FIG. 4 is a timing diagram of signals in a synchronous rectifier controller following an enable event in accordance with some embodiments.

FIG. 4 is a timing diagram 400 of signals in a synchronous rectifier controller following an enable event in accordance with some embodiments. The timing diagram 400 shows various signals and timing periods that can occur in synchronous rectifier operation using, for example, an SRC such as that shown in FIG. 2, and implementing a state operation such as that shown in FIG. 3. The horizontal axis represents time, progressing from left to right, and the vertical axis indicates signal level or timer "on" periods. Along the horizontal axis different time points 420-454 are marked and carried across each signal by a dashed line. The signals include a current sense signal 402, a trigger ("TRIG") signal 404, a minimum on time timer 406, a minimum off time timer 408, and a drive signal 410.

The current sense signal 402 is graphed with respect to a zero voltage level 414, and corresponds to the voltage drop across the MOSFET (e.g. MOSFET 130). Three threshold levels are shown in dashed line; the RESET threshold 412 (e.g. 248), the OFF threshold 416 (e.g. 220), and the ON threshold 418 (e.g. 212). When this voltage is negative, or sufficiently negative, it can correspond to current through the "on" resistance of the MOSFET. The ON threshold 418 represents a voltage level that can indicate the start of a conduction phase when the drive signal should be asserted to turn on the MOSFET. The OFF threshold 416 represents a voltage level at which the conduction phase should be terminated, and it is higher than the ON threshold 418 since it represents a lower current level through the MOSFET than that of the ON threshold 418. The RESET threshold 412 is higher than the OFF threshold, and can be substantially positive (i.e. above zero 414), and is selected to be at a level that substantially indicates the reverse blocking phase of rectifier operation, although transient excursion may exceed the RESET threshold in some embodiments. The OFF and ON threshold 416, 418 levels are dictated by the particular application and the drain to source "on" resistance of the MOSFET.

At the starting time, time 420, the current sense signal 402 is above the RESET threshold, thus the output of the RESET comparator will be asserted. The OFF time timer is pending at time 420 for a short period. Prior to time 422 the trigger signal 404 is asserted, but is de-asserted at time 422. Since the MOSFET was not on (i.e. drive signal 410 is low/de-asserted), however, the pulse of the trigger signal ending at time 422 has no effect. At time 422, the SRC state can be, for example, at state 312 of FIG. 3. At time 424, the current sense signal 402 drops below the ON threshold, causing the output of the ON comparator to be asserted. Since the trigger signal 404 is low and the ON comparator output is asserted, the SRC state transitions to state 314, the drive signal 410 is asserted to turn on the MOSFET, and the minimum on time timer 406 commences. The minimum on time timer runs from time 424 to time 426, during which time it can be seen that the current sense signal 402 experiences a positive-going transient. Since the minimum on time is pending, however, this transient is ignored. At time 426 the current sense signal 402 has settled and remains below the OFF threshold 414 until time 428, which corresponds to state 318. At time 428 the output of the OFF comparator is asserted, and the drive signal 410 is then shut off/de-asserted, transitioning to state 324. At time 430 a transient in the current sense signal 402 rises above the RESET threshold 412, causing the output of the RESET comparator to be asserted, and the state transitions to state 328 where the minimum off time timer 408 is commenced. However, at time 432 the current sense signal 402 falls below the RESET threshold 412, causing the output of the RESET comparator to be de-asserted, and the state then transitions back to state 324 via transition 330. At time 433, the current sense signal 402 again rises, causing the output of the RESET comparator to assert, resulting in a transition back to state 328, and re-commencing the minimum off time timer 408. Once the minimum off time has elapsed, the state transitions to state 312, where the SRC waits for the ON comparator output to be asserted.

Shortly after time 433, the trigger signal 404 is asserted. Between time 433 and time 434 the current sense signal 402 remains above the RESET threshold 412. At time 434 another conduction phase commences, and the current sense signal 402 falls below the ON threshold 418, causing the ON comparator to assert its output. However, because the trigger signal 404 is still asserted at time 434, instead of transitioning from state 312 to state 314, the SRC transitions to state 334 in accordance with transition 332. As a result, the drive signal 410 is not asserted at time 434 due to the trigger signal 404 being asserted at that time. The minimum on time of the minimum on time timer 406 elapses at time 440, at which time the SRC state transitions to state 324 and remains in state 324 while the current sense signal 402 remains below the RESET threshold 412. A pulse of the trigger signal 404 between times 444 and 446 has no effect since the drive signal 410 is not asserted at that time. Another transient occurs after time 446, exceeding the RESET threshold 412 between times 448 and 450. At time 448 the SRC state transitions to state 328 from state 324 and the minimum of time timer 408 is commenced. At time 450, since the current sense signal 402 falls below the RESET threshold, the SRC state transitions back to state 324. The minimum off time timer 408 is reset. At time 452 the current sense signal 402 again rises above the RESET threshold 412, the SRC is then in state 328, and the minimum off time timer 408 is commenced. The current sense signal 402 then remains above the RESET threshold until the minimum off time timer elapses at time 454, and the SRC transitions to state 312.

As can be seen, even though the trigger signal interrupts operation at time 434, when the SRC would normally turn on the MOSFET, the subsequent transient excursion above the OFF threshold 414 does not result in a false minimum off time. Rather, the fall of the transient resets the minimum off time timer until time 452, which corresponds to the blocking phase of the rectifier operation. Thus, self-synchronization of switching the MOSFET on only for actual conduction phases is achieved by use of the RESET threshold 412 to control state transitions involving the minimum off time timer.

Figure 5:
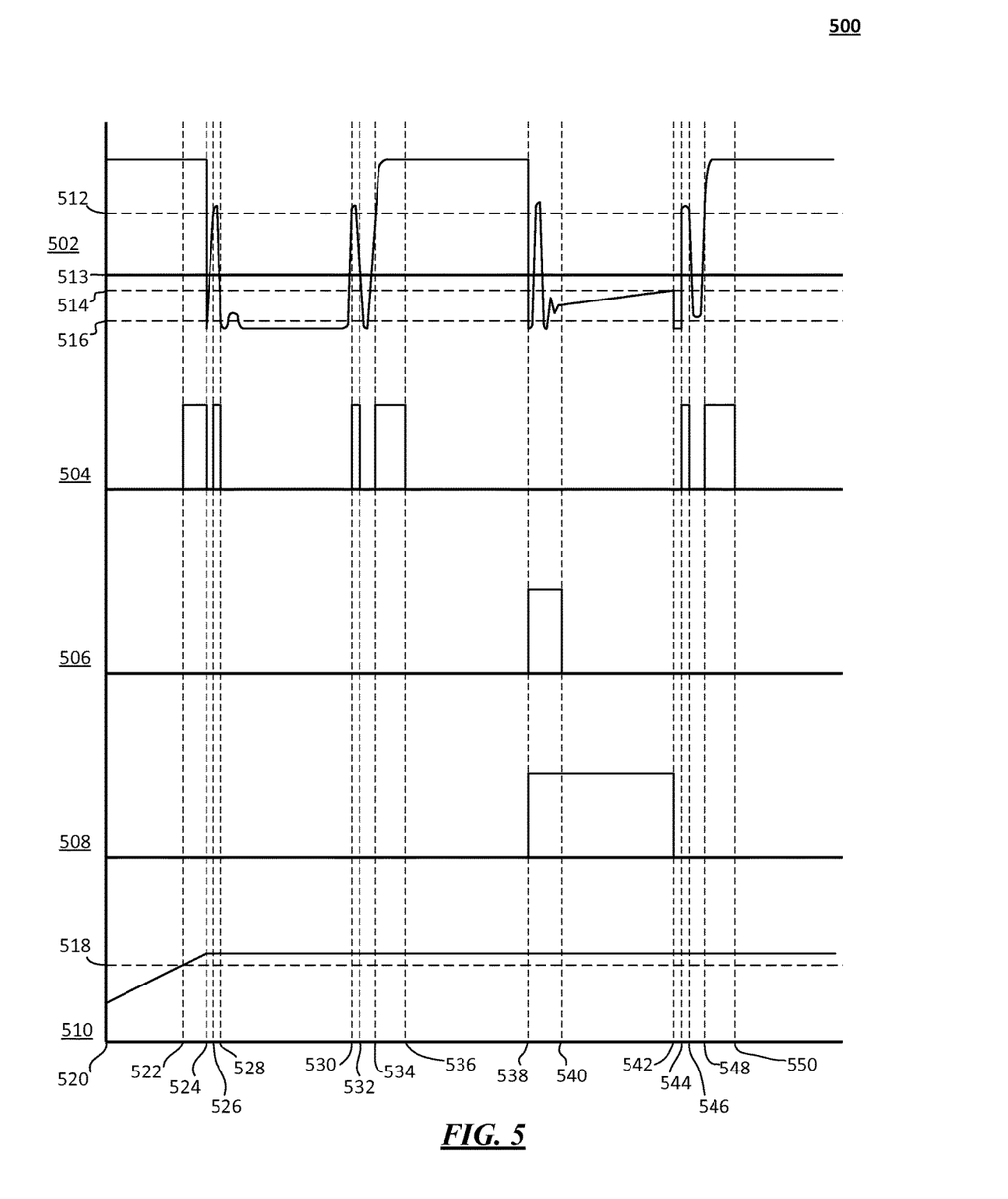
FIG. 5 is a timing diagram of signals at start up in a synchronous rectifier controller in accordance with some embodiments.

FIG. 5 is a timing diagram 500 of signals at start up in a SRC in accordance with some embodiments. The timing diagram 500 illustrates achievement of synchronous switching operation of the MOSFET after a start-up event, as when the SMPS is turned on. As in FIG. 4, the horizontal axis represents a progression of time from left to right, and the vertical axis represent signal magnitude or timer pendency. The graphs include a current sense signal 502, a minimum off time timer 504, a minimum on time timer 506, a drive signal 508, and a supply voltage 510. The current sense signal 502, minimum off and on timers 504, 506, and the drive signal 508 are produced the same as in FIG. 4. The supply voltage 510 can be, for example, $V_{CC}$ 240 of FIG. 2.

At time 520, the supply voltage 510 is below a supply voltage threshold 518, and the current sense voltage 502 is above the RESET threshold 512. The supply voltage 510 is compared to the supply voltage threshold 518, and while the supply voltage 502 is below the supply voltage threshold 518 the output of the under-voltage lockout comparator output (UVLO) will be asserted. Neither the minimum off or on time timers 504, 506 are pending, and the drive signal 508 is not asserted so the MOSFET is turned off. The SRC state will be in state 302.

At time 522 the supply voltage passes the supply voltage threshold 518, causing the UVLO comparator output to be de-asserted, and the SRC state to transition to state 306 where the minimum off time timer 504 is commenced. At time 524, before the minimum off time timer 504 has elapsed, the current sense signal 502 falls below the ON threshold 516, causing the output of the RESET comparator to be de-asserted. Since in state 306 if the minimum off time timer 504 is pending and the RESET comparator is de-asserted, the SRC state transitions back to state 302, resetting the minimum off time timer 504. At time 526 the current sense signal 502 again rises above the RESET threshold 512 during a transient, briefly again transitioning to state 306 and commencing the minimum off time timer 504 until time 528 when current sense signal drops below the RESET threshold, causing a transition back to state 302. It will be noted that even though the current sense signal fell below the ON threshold 516, because of the state operation of the SRC the drive signal 508 was not asserted, which is different than conventional SRC operation. Thus, by using state operation in accordance FIG. 3, a false conduction phase is avoided, thereby preventing cross conduction to avoid discharge of the bulk capacitor of the secondary side through the transformer.

The transition from state 302 to state 306, and back to state 302 occurs again from time 530 to time 532 where it can be seen that the minimum off time timer 504 is briefly commenced, as occurred between times 526 and 528. Then at time 534 the current sense signal 502 rises above the RESET threshold 512, causing a transition to state 306, and the minimum off time timer 504 is commenced. The current sense signal 502 then remains above the RESET threshold, allowing the minimum off time timer 504 to elapse at time 536, allowing a transition to state 312, where the SRC state machine then waits for the ON comparator output to be asserted. At time 538 the current sense signal falls below the ON threshold 516, causing a transition to state 314 where the drive signal 508 is asserted, turning on the MOSFET. Also at time 538, as a result of transitioning to state 314, the minimum on time timer 506 is commenced. During pendency of the minimum on time timer 506 from time 538 to time 540, changes in the current sense signal 502 are ignored, even excursions above the RESET threshold. At time 540, the minimum on time timer 506 finishes and the state transitions from state 314 to state 318.

At time 542 the current sense signal 502 rises to the OFF threshold 514, causing the output of the OFF comparator to be asserted. As a result, the state transitions from state 318 to state 324 and the drive signal is turned off. In state 324 the SRC waits for the current sense signal 502 to exceed the RESET threshold 512, which briefly occurs during a transient between times 544 and 546, causing a brief transition to state 328 and then back to state 324 at time 546. At time 548 the current sense signal again exceed the RESET threshold 512, causing a transition to state 328 where the minimum off time timer 504 is commenced. The current sense signal 502 remains above the RESET threshold long enough for the minimum off time timer 504 to elapse at time 550, resulting in a transition from state 328 to state 312. Thus, self-synchronization is achieved despite the presence of transients, and without the typical issue of cross conduction occurring at start-up. After the SRC state transitions back to state 312, the process is repeated and normal synchronous operation occurs, unless, as in FIG. 4, the SRC is put to sleep or otherwise disabled, in which case, as shown in FIG. 4, self-synchronization occurs by following the state transitions in accordance with FIG. 3.

Accordingly, embodiments in accordance with the teachings herein avoid the problems associated with the prior art by avoiding starting of the blanking periods (i.e. the minimum off and on times) by commencing the minimum off time timer only when the switching transistor used for synchronous rectifier operation should be in a blocking phase as indicated by a steady state of the current sense signal being sufficiently positive. The embodiments provide a benefit of self-synchronization by resetting the minimum off time timer when the current sense signal falls below a reset threshold. The reset threshold is selected to sufficiently high to indicate the conduction phase has ended, although transients may exceed the reset threshold. However, when the transient voltage falls below the reset threshold, the minimum off time timer is reset and not started again until the current sense voltage again rises above the reset threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method for self-synchronization in a synchronous rectifier controller (SRC), comprising:
    sensing a current sense signal;
    comparing the current sense signal to a RESET threshold;
    commencing a minimum off time timer when the current sense signal exceeds the RESET threshold; and
    resetting the minimum off time timer when the current sense voltage falls below the RESET threshold before the minimum off time timer has lapsed.

2. The method of claim 1, further comprising when the minimum off time timer elapses while the current sense signal remains above the RESET threshold, commencing a state of waiting for the current sense signal to fall below an ON threshold after the minimum off time timer has elapsed.

3. The method of claim 2, further comprising:
    detecting the current sense signal falling below the ON threshold; and
    responsive to detecting the current sense signal falling below the ON threshold, asserting a drive signal and commencing a minimum on time timer.

4. The method of claim 1, wherein sensing the current signal and comparing the current sense signal to the RESET threshold commence after a supply voltage provided to the SRC rises above a supply voltage threshold.

5. The method of claim 1, wherein the minimum off time timer has a duration that is externally configurable.

6. The method of claim 1, wherein the RESET threshold is at a positive voltage level with respect to a ground level.

7. The method of claim 1, wherein sensing the current signal and comparing the current sense signal to the RESET threshold commences after a sleep mode of the SRC ends.

8. A synchronous rectifier controller, comprising:
    a RESET comparator that compares a current sense signal to a RESET threshold and provides an output that is asserted when the current sense signal is above the RESET threshold and de-asserted otherwise;
    a minimum off time timer; and
    control logic that commences the minimum off time timer when the output of the RESET comparator is asserted and resets the minimum off time timer when output of the RESET comparator is de-asserted.

9. The synchronous rectifier controller of claim 8, further comprising a supply voltage comparator that compares a supply voltage to a supply voltage threshold and provides an output to the control logic that is asserted when the supply voltage is below the supply voltage threshold and de-asserted when the supply voltage is above the supply voltage threshold, and wherein the control logic does not commence the minimum off time timer when the output of the supply voltage comparator is asserted.

10. The synchronous rectifier controller of claim 8, further comprising:
    an ON comparator that compares the current sense signal to an ON threshold and provides an output to the control logic that is asserted when the current sense signal is below the ON threshold and de-asserted otherwise; and
    a minimum on time timer that is commenced upon the output of the ON comparator being asserted;
    wherein the control logic asserts a drive signal at the start of a conduction phase as indicated by the output of the ON comparator being asserted and the minimum off time timer elapsing prior to the start of the conduction phase.

11. The synchronous rectifier controller of claim 10, further comprising a trigger comparator the compares a trigger input to a trigger threshold and provides an output to the control logic that is asserted when the trigger input is above the trigger threshold and de-asserted otherwise, wherein the control logic further requires that the trigger input be de-asserted to assert the drive signal.

12. The synchronous rectifier controller of claim 10, further comprising:
    an OFF comparator that compares the current sense signal to an OFF threshold and provides an output to the control logic that is asserted when the current sense signal is above the OFF threshold and de-asserted otherwise;
    wherein the control logic de-asserts the drive signal when the output of the OFF comparator is asserted, and after the minimum on time timer has elapsed.

13. The synchronous rectifier controller of claim 10 further comprising a sleep detector that provided a sleep signal to the control logic, and wherein the control logic further requires that the sleep signal be de-asserted to assert the drive signal.

14. The synchronous rectifier controller of claim 10, wherein a duration of the minimum on time timer is externally configurable.

15. The synchronous rectifier controller of claim 8, wherein a duration of the minimum off time timer is externally configurable.

16. A semiconductor device including a self-synchronizing synchronous rectifier controller, comprising:
    a RESET comparator that compares a current sense signal to a RESET threshold and provides an output that is asserted when the current sense signal is above the RESET threshold and de-asserted otherwise;
    a minimum off time timer;
    a minimum on time timer;
    control logic that commences the minimum off time timer when the output of the RESET comparator is asserted and resets the minimum off time timer when output of the RESET comparator is de-asserted;
    an ON comparator that compares the current sense signal to an ON threshold and provides an output to the control logic that is asserted when the current sense signal is below the ON threshold and de-asserted otherwise; and wherein the control logic commences the minimum on time timer upon the output of the ON comparator being asserted;

wherein the control logic asserts a drive signal at the start of a conduction phase as indicated by the output of the ON comparator being asserted and the minimum off time timer elapsing prior to the start of the conduction phase.

17. The semiconductor device of claim 16, further comprising a supply voltage comparator that compares a supply voltage to a supply voltage threshold and provides an output to the control logic that is asserted when the supply voltage is below the supply voltage threshold and de-asserted when the supply voltage is above the supply voltage threshold, and wherein the control logic does not commence the minimum on time timer when the output of the supply voltage comparator is asserted.

18. The semiconductor device of claim 16, further comprising a trigger comparator the compares a trigger input to a trigger threshold and provides an output to the control logic that is asserted when the trigger input is above the trigger threshold and de-asserted otherwise, wherein the control logic further requires that the trigger input be de-asserted to assert the drive signal.

19. The semiconductor device of claim 16, further comprising:

an OFF comparator that compares the current sense signal to an OFF threshold and provides an output to the control logic that is asserted when the current sense signal is above the OFF threshold and de-asserted otherwise;

wherein the control logic de-asserts the drive signal when the output of the OFF comparator is asserted, and after the minimum on time timer has elapsed.

20. The semiconductor device of claim 16 further comprising a sleep detector that provided a sleep signal to the control logic, and wherein the control logic further requires that the sleep signal be de-asserted to assert the drive signal.

\* \* \* \* \*